United States Patent
Ide et al.

(10) Patent No.: US 10,514,100 B2
(45) Date of Patent: Dec. 24, 2019

(54) GASKET

(71) Applicant: NOK CORPORATION, Tokyo (JP)

(72) Inventors: Kento Ide, Shizuoka (JP); Mitsuyasu Nakajima, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/792,840

(22) Filed: Oct. 25, 2017

(65) Prior Publication Data

US 2018/0119818 A1 May 3, 2018

(30) Foreign Application Priority Data

Nov. 2, 2016 (JP) .................................. 2016-214859

(51) Int. Cl.
*F16J 15/08* (2006.01)
*F02D 11/00* (2006.01)
(Continued)

(52) U.S. Cl.
CPC ...... *F16J 15/0825* (2013.01); *F01N 13/1827* (2013.01); *F02F 11/00* (2013.01); *F16J 2015/085* (2013.01)

(58) Field of Classification Search
CPC ............... F16J 15/0825; F16J 2015/085; F16J 2015/0862; F16J 2015/0868
See application file for complete search history.

(56) References Cited

U.S. PATENT DOCUMENTS 2,737,405 A * 3/1956 Shinn ....................... F16J 15/46
                                                          277/591
4,711,456 A * 12/1987 Udagawa ............... F02F 11/002
                                                          277/601
(Continued)

FOREIGN PATENT DOCUMENTS

| CN | 205136591 U | 4/2016 |
|---|---|---|
| CN | 105829781 A | 8/2016 |
| JP | 2016-148408 A | 8/2016 |

OTHER PUBLICATIONS

Chinese Office Action dated Aug. 22, 2019 for corresponding Chinese Application No. 201710993351.0 and English translation.

*Primary Examiner* — Nicholas L Foster
(74) *Attorney, Agent, or Firm* — Pearne & Gordon LLP

(57) ABSTRACT

A gasket sandwiched between an opening of a first member and an opening of a second member. The gasket comprises a first gasket substrate including a first bead protruding along a peripheral edge of a first opening portion disposed corresponding to the opening of the first member and toward a side of the first member, the first gasket substrate being disposed on a side of the first member. A second gasket substrate including a second bead protruding along a peripheral edge of a second opening portion disposed corresponding to the opening of the second member and toward a side of the second member, the second gasket substrate being disposed on a side of the second member, and an intermediate substrate interposed between the first gasket substrate and the second gasket substrate. The intermediate substrate includes a through-hole having a predetermined width and a predetermined length formed along a longitudinal direction of the first bead and the second bead in a portion facing the first bead and the second bead.

7 Claims, 3 Drawing Sheets

(51) Int. Cl.
*F01N 13/18* (2010.01)
*F02F 11/00* (2006.01)

(56) References Cited

U.S. PATENT DOCUMENTS

| | | | | |
|---|---|---|---|---|
| 5,378,001 A * | 1/1995 | Miyaoh | F16J 15/0825 | 277/595 |
| 5,382,029 A * | 1/1995 | Udagawa | F16J 15/0825 | 277/591 |
| 5,431,418 A * | 7/1995 | Hagiwara | F16J 15/0825 | 277/592 |
| 5,516,120 A * | 5/1996 | Damusis | F16J 15/123 | 277/591 |
| 5,775,701 A * | 7/1998 | Martini | F16J 15/0887 | 277/591 |
| 5,979,906 A * | 11/1999 | Silvian | F16J 15/0825 | 277/593 |
| 6,076,833 A * | 6/2000 | Geshi | F16J 15/0825 | 277/593 |
| 6,349,944 B1 * | 2/2002 | Sugiyama | F16J 15/062 | 277/591 |
| 6,406,032 B1 * | 6/2002 | Miyaoh | F16J 15/0818 | 277/594 |
| 7,703,775 B2 * | 4/2010 | Matsushita | F16J 15/0825 | 277/598 |
| 8,556,271 B2 * | 10/2013 | Schmitz | F16J 15/0825 | 277/593 |
| 8,608,178 B2 * | 12/2013 | Mori | F02F 11/00 | 277/594 |
| 8,668,205 B2 * | 3/2014 | Schmitt | F16J 15/0825 | 277/592 |
| 8,695,986 B2 * | 4/2014 | Clemons | F16J 15/0825 | 277/592 |
| 8,714,564 B2 * | 5/2014 | Ogaeri | F16J 15/0825 | 277/591 |
| 8,899,596 B2 * | 12/2014 | Imai | F16J 15/0825 | 277/593 |
| 9,291,121 B2 * | 3/2016 | Mori | F02F 11/00 | |
| 2007/0267822 A1 * | 11/2007 | Imai | F16J 15/0825 | 277/593 |
| 2007/0290452 A1 * | 12/2007 | Matsushita | F16J 15/0825 | 277/595 |
| 2008/0191425 A1 * | 8/2008 | Gasch | F02F 11/002 | 277/593 |
| 2010/0225071 A1 * | 9/2010 | Mori | F02F 11/00 | 277/592 |
| 2012/0126491 A1 * | 5/2012 | Schmitt | F16J 15/0825 | 277/593 |
| 2013/0187344 A1 * | 7/2013 | Ogaeri | F16J 15/0825 | 277/597 |
| 2014/0062033 A1 * | 3/2014 | Mori | F02F 11/00 | 277/591 |

* cited by examiner

GASKET

CROSS REFERENCE TO RELATED APPLICATIONS

This application claims the benefit of Japanese Patent Application No. 2016-214859, filed Nov. 2, 2016, which is hereby incorporated by reference in its entirety.

BACKGROUND

Technical Field

The present disclosure relates to a gasket and is suitably applied to, for example, a metal gasket sandwiched on a joint surface between a flange of an exhaust manifold and a flange of an exhaust pipe.

Background

Conventionally, a metal gasket is commonly used as a gasket sandwiched on a joint surface between a flange of an exhaust manifold and a flange of an exhaust pipe (see Japanese Patent Application Laid-Open No. 2016-148408).

The metal gasket is fastened by fastening bolts in a state of being sandwiched between joint surfaces of the mutually facing flanges to be sealed so as to prevent leakage of high-temperature exhaust gas flowing from the exhaust manifold to the exhaust pipe.

The metal gasket is made up of metal substrates and includes beads each of which is a portion bendingly formed so as to surround an opening portion disposed corresponding to each opening of the flanges of the exhaust manifold and the exhaust pipe. When the metal gasket is sandwiched between the flange of the exhaust manifold and the flange of the exhaust pipe, the mutually facing flanges are sealed by a reaction force (restoring force) generated when the beads are compressed.

The metal gasket in an exhaust system is used in high temperature environments such as to seal exhaust gas, and thus is commonly made by laminating steel plates with heat resistance (hereinafter referred to as "heat-resistant steel plates") so that the beads can follow the deformation of the facing flanges. As the temperature of the exhaust gas from the engine increases, the temperature of the exhaust gas is currently approaching a heat-resistant limit temperature of the heat-resistant steel plate, thus leading to an increase in the number of laminated metal substrates forming the metal gasket.

SUMMARY

The metal gasket in such an exhaust system is commonly fastened by fastening bolts in a state of being sandwiched between joint surfaces of the flanges. However, in a portion where a pitch between a fastening bolt and a fastening bolt (hereinafter may also be referred to as a "bolt pitch") is long, the surface pressure on the flanges tends to be low, and thus the sealing properties may be impaired.

In addition, in the metal gasket, an axial force is less likely to be applied to the beads in a portion of long bolt pitch than to the beads in a portion of short bolt pitch, leading to a state in which exhaust gas is most easily removed. Therefore, the amount of exhaust gas leaked from the portion of long bolt pitch is the largest and at the same time the portion of long bolt pitch is exposed to high temperatures due to exhaust gas. Consequently, the beads in the portion of long bolt pitch deteriorate earlier than the beads in the portion of short bolt pitch, and thus the restoring force of the beads in the portion of long bolt pitch are reduced, which may shorten the life of the metal gasket.

The present disclosure is related to providing a gasket capable of prolonging the life while maintaining the sealing properties as compared with conventional gaskets.

In accordance with one aspect of the present disclosure, a gasket sandwiched between an opening of a first member and an opening of a second member, the gasket comprising: a first gasket substrate including a first bead protruding along a peripheral edge of a first opening portion disposed corresponding to the opening of the first member and toward a side of the first member, the first gasket substrate being disposed on a side of the first member; a second gasket substrate including a second bead protruding along a peripheral edge of a second opening portion disposed corresponding to the opening of the second member and toward a side of the second member, the second gasket substrate being disposed on a side of the second member; and an intermediate substrate interposed between the first gasket substrate and the second gasket substrate, wherein the intermediate substrate includes a through-hole having a predetermined width and a predetermined length formed along a longitudinal direction of the first bead and the second bead in a portion facing the first bead and the second bead.

In accordance with one aspect of the present disclosure, when the gasket has a portion of a short inter-fastening distance and a portion of a long inter-fastening distance when fastened to the first member and the second member by a plurality of fastening members in a state of being sandwiched between the opening of the first member and the opening of the second member, the through-hole of the intermediate substrate is formed in the portion of the long inter-fastening distance.

In accordance with one aspect of the present disclosure, the through-hole has a relationship where the length is greater than the width.

In accordance with one aspect of the present disclosure, because of the presence of the first bead and the second bead formed along a peripheral edge of the opening portion, the through-hole formed in the intermediate substrate maintains the sealing properties between the first member and the second member and functions as a heat insulating layer for blocking the transmission of fluid heat passing between the opening of the first member and the opening of the second member. Thus, it is possible to prevent the reduction in the sealing properties of the first bead and the second bead under the influence of the fluid heat and prolong the life.

DETAILED DESCRIPTION

Hereinafter, the present embodiment will be described with reference to the accompanying drawings.

Figure 1:
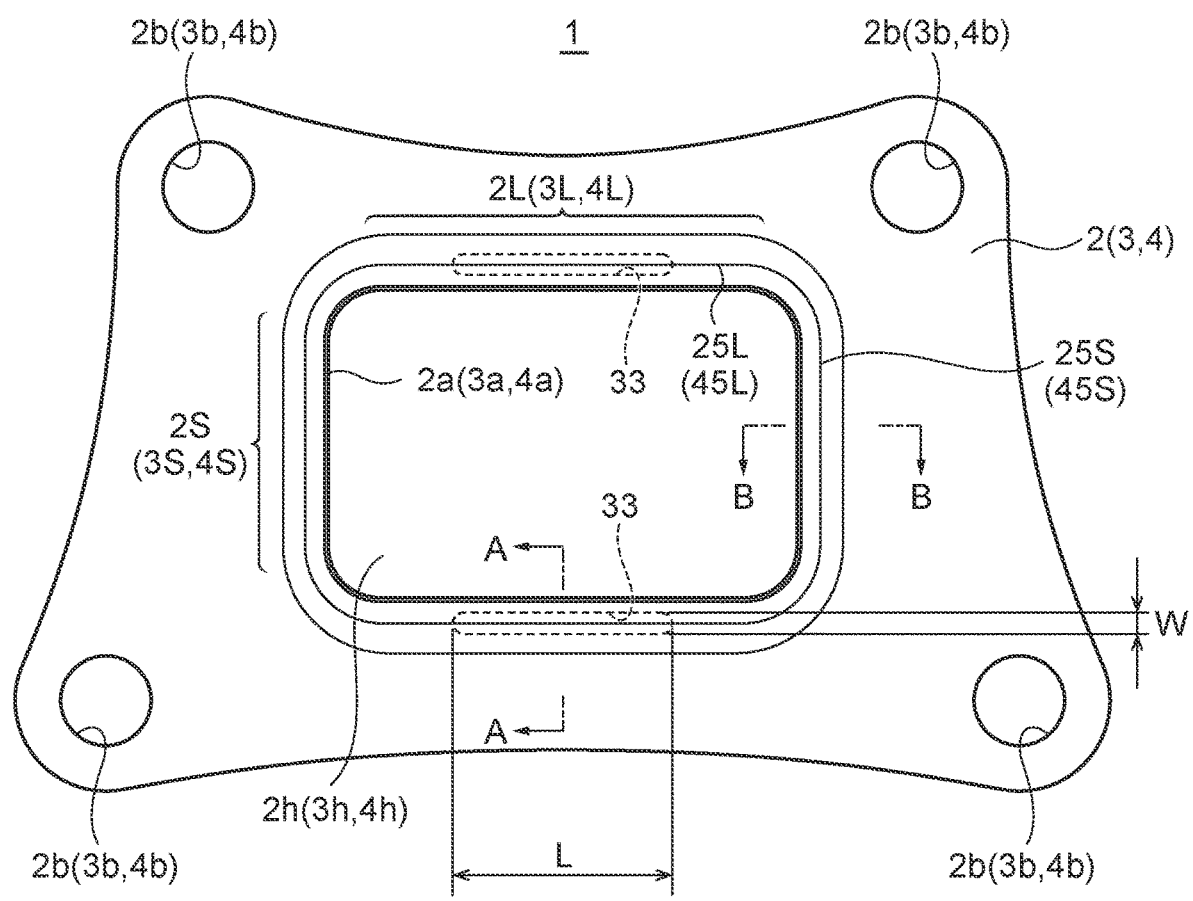
FIG. 1 is a plan view illustrating a configuration of a gasket according to the present embodiment.
Figure 2:
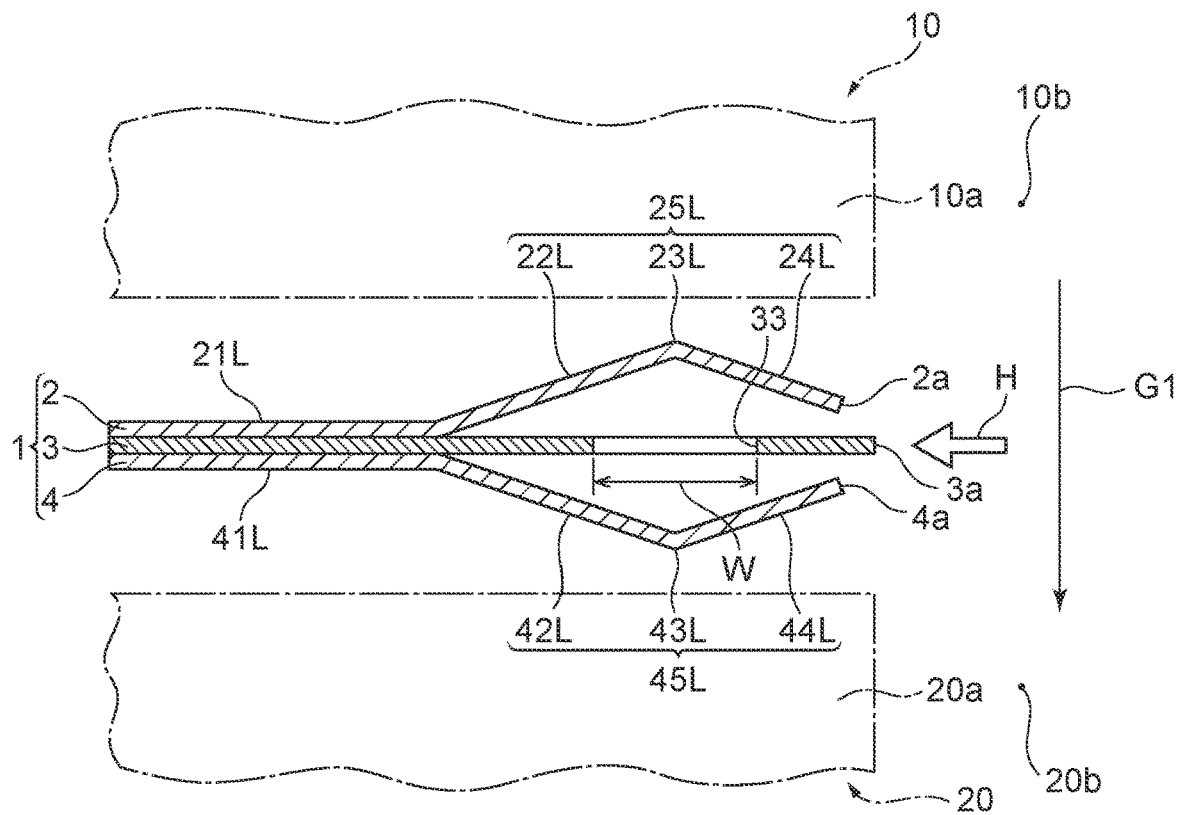
FIG. 2 is a sectional view illustrating a configuration of a portion of a long inter-bolt-pitch distance in the gasket according to the present embodiment.
Figure 3:
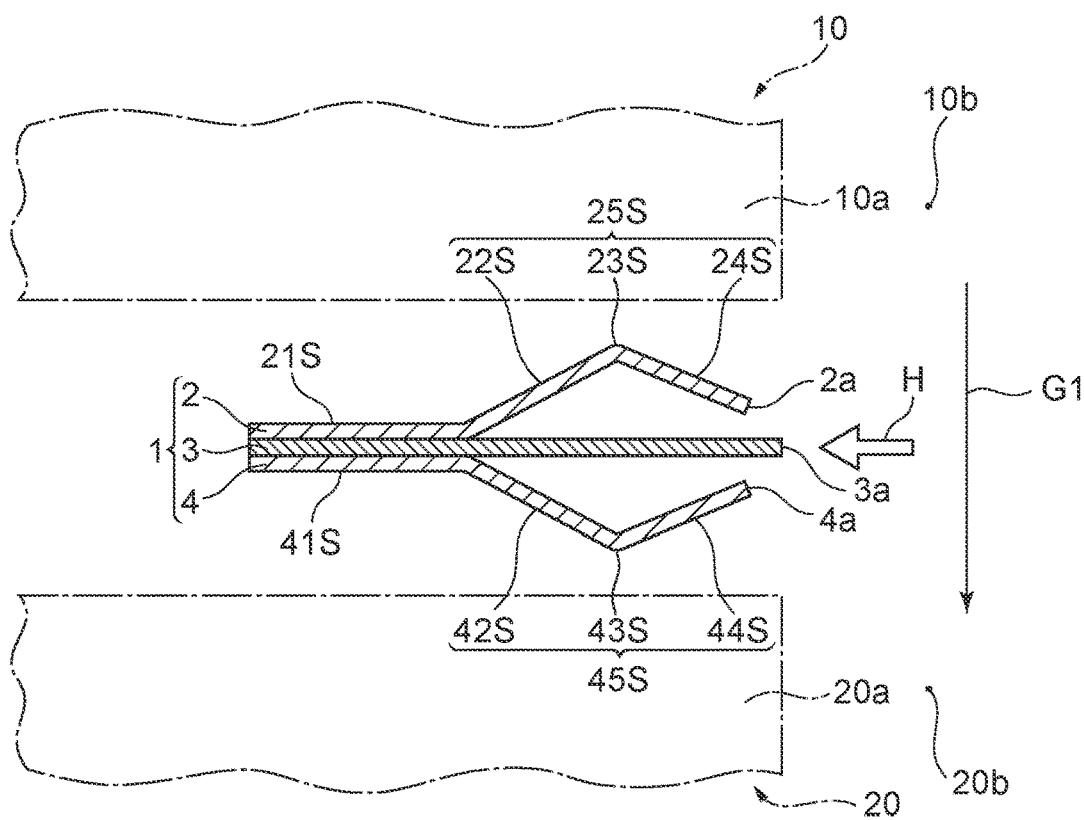
FIG. 3 is a sectional view illustrating a configuration of a portion of a short inter-bolt-pitch distance in the gasket according to the present embodiment.
Figure 4:
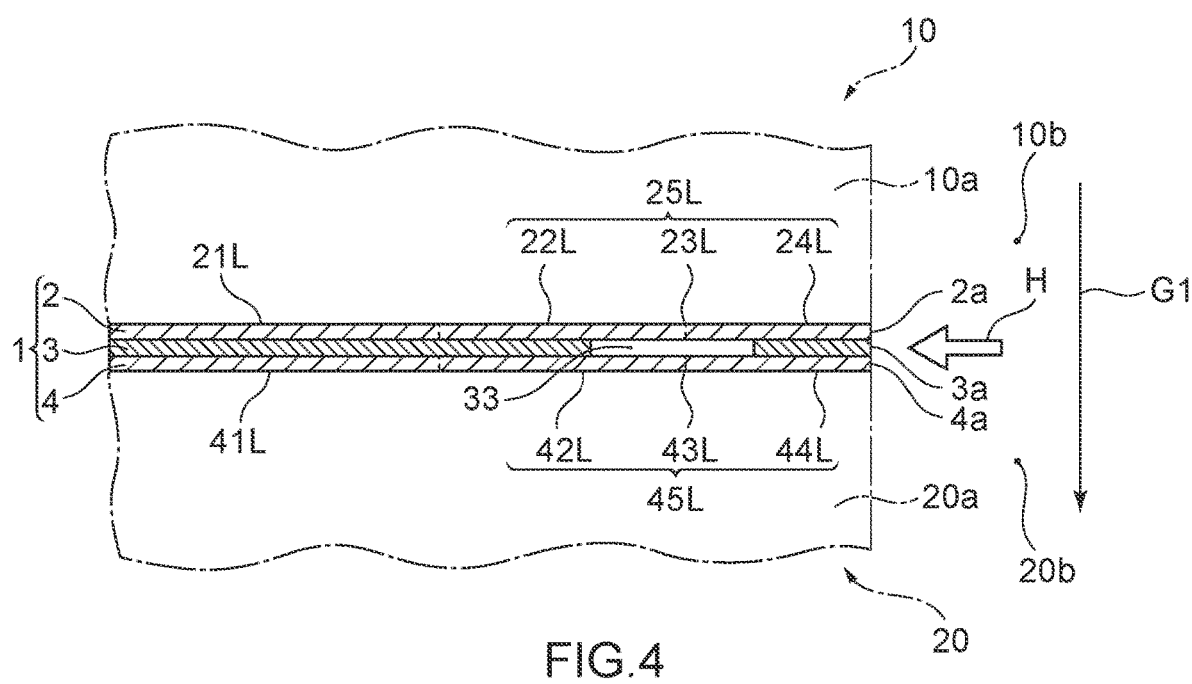
FIG. 4 is a sectional view illustrating a state of the portion of a long inter-bolt-pitch distance when the gasket according to the present embodiment is installed.

FIG. 1 is a plan view illustrating a configuration of a gasket according to the present embodiment. FIG. 2 is a sectional view illustrating a configuration of a portion of a long inter-bolt-pitch distance in the gasket according to the present embodiment. FIG. 3 is a sectional view illustrating a configuration of a portion of a short inter-bolt-pitch distance in the gasket according to the present embodiment. FIG. 4 is a sectional view illustrating a state of the portion of a long inter-bolt-pitch distance when the gasket according to the present embodiment is installed.

<Configuration of Metal Gasket>

As illustrated in FIGS. 1 to 3, a metal gasket 1 according to the present embodiment is sandwiched between the mutually facing joint surfaces of, for example, a flange 10a of an exhaust manifold 10 (hereinafter referred to as an "exhaust manifold side flange") as a first member in an automobile engine and a flange 20a of an exhaust pipe 20 (hereinafter referred to as an "exhaust side flange") as a second member to seal an exhaust gas G1 flowing from an opening 10b of the exhaust manifold 10 to an opening 20b of the exhaust pipe 20. The opening 10b of the exhaust manifold 10 and the opening 20b of the exhaust pipe 20 have the same shape and the same size.

The metal gasket 1 includes a first gasket substrate 2 disposed on a side of the exhaust manifold side flange 10a, a second gasket substrate 4 disposed on a side of the exhaust side flange 20a, and an intermediate substrate 3 interposed between the first gasket substrate 2 and the second gasket substrate 4.

The first gasket substrate 2 and the second gasket substrate 4 are made of materials having spring properties such as stainless steel, cold rolled steel plate, galvanized steel plate, and aluminum plywood, and have the same thickness throughout.

The first gasket substrate 2 and the second gasket substrate 4 include opening portions 2h and 4h (FIG. 1) in the center of the substrates, each opening portion serving as a flow path of the exhaust gas G1 to be sealed, and four bolt insertion holes 2b and 4b (FIG. 1) used to insert bolts for sandwiching and fastening the substrates between the exhaust manifold side flange 10a and the exhaust side flange 20a.

The intermediate substrate 3 is also made of materials having spring properties such as stainless steel, cold rolled steel plate, galvanized steel plate, and aluminum plywood, and have the same thickness throughout. Note that the intermediate substrate 3 is used as a shim for gap adjustment between the exhaust manifold side flange 10a and the exhaust side flange 20a.

In addition, the intermediate substrate 3 includes an opening portion 3h (FIG. 1) in the center of the substrate and serving as a flow path of the exhaust gas G1 to be sealed, and four bolt insertion holes 3b (FIG. 1) used to insert bolts for sandwiching and fastening the substrates between the exhaust manifold side flange 10a and the exhaust side flange 20a.

The opening portion 2h of the first gasket substrate 2, the opening portion 3h of the intermediate substrate 3, and the opening portion 4h of the second gasket substrate 4 have all the same shape and the same size as each other, and have the same shape and the same size as the opening 10b of the exhaust manifold 10 and the opening 20b of the exhaust pipe 20, and are disposed facing each other when the metal gasket 1 is sandwiched.

The metal gasket 1 includes four bolt insertion holes 2b, 3b, and 4b. When the metal gasket 1 is fastened to flanges by fastening bolts (unillustrated) through the four bolt insertion holes 2b, 3b, and 4b, the metal gasket 1 has two regions 2L (3L, 4L) of a long inter-fastening distance (hereinafter referred to as a "bolt pitch") and two regions 2S (3S, 4S) of short bolt pitch.

In the metal gasket 1, FIG. 2 illustrates a cross-sectional configuration of a portion corresponding to the regions 2L (3L, 4L) of long bolt pitch, taken along a line A-A. FIG. 3 illustrates a cross-sectional configuration of a portion corresponding to the regions 2S (3S, 4S) of short bolt pitch, taken along a line B-B.

As illustrated in FIG. 2, the portions corresponding to the regions 2L (3L, 4L) of the first gasket substrate 2 and the second gasket substrate 4 include a first flat portion 21L and a second flat portion 41L, and a first bead 25L and a second bead 45L formed so as to surround a first opening portion 2h and a second opening portion 4h along a peripheral edge of the first opening portion 2h and the second opening portion 4h respectively.

The first bead 25L of the first gasket substrate 2 is a one side support type flap bead including a first inclined surface portion 22L rising obliquely from the flat portion 21L so as to be spaced apart from the intermediate substrate 3, a convexly bent top portion 23L, and a second inclined surface portion 24L falling obliquely from the top portion 23L toward the opposite side of the first inclined surface portion 22L so as to approach the intermediate substrate 3 but formed not to contact the intermediate substrate 3.

Here, the front end of the second inclined surface portion 24L serves as the opening end 2a forming the opening portion 2h. As described above, the first bead 25L is formed by the first inclined surface portion 22L, the top portion 23L, and the second inclined surface portion 24L, and expands by a predetermined amount from the flat portion 21L toward the exhaust manifold side flange 10a. When the metal gasket 1 is sandwiched, the first bead 25L is crushed by the exhaust manifold side flange 10a to be extended in a flat shape, and the opening end 2a of the second inclined surface portion 24L matches the opening end 3a of the intermediate substrate 3.

The second bead 45L of the second gasket substrate 4 is a one side support type flap bead including a first inclined surface portion 42L rising obliquely from the flat portion 41L so as to be spaced apart from the intermediate substrate 3, a convexly bent top portion 43L, and a second inclined surface portion 44L falling obliquely from the top portion 43L toward the opposite side of the first inclined surface portion 42L so as to approach the intermediate substrate 3 but formed not to contact the intermediate substrate 3.

Here, the front end of the second inclined surface portion 44L serves as the opening end 4a forming the opening portion 4h. As described above, the second bead 45L is formed by the first inclined surface portion 42L, the top portion 43L, and the second inclined surface portion 44L, and expands by a predetermined amount from the flat portion 41L toward the exhaust side flange 20a. When the metal gasket 1 is sandwiched, the second bead 45L is crushed by the exhaust side flange 20a to be extended in a flat shape, and the opening end 4a of the second inclined surface portion 44L matches the opening end 3a of the intermediate substrate 3.

In this case, the first bead 25L of the first gasket substrate 2 and the second bead 45L of the second gasket substrate 4 are opposite in the expansion direction to each other, but are formed to have the same expansion amount. It should be noted that, without being limited to this, the expansion amount of the first bead 25L and the expansion amount of the second bead 45L need not be the same, but either one of the expansion amounts may be larger.

Meanwhile, as illustrated in FIG. 3, the portions corresponding to the regions 2S (3S, 4S) of the first gasket substrate 2 and the second gasket substrate 4 include a first flat portion 21S and a second flat portion 41S, and a first bead 25S and a second bead 45S formed so as to surround the first opening portion 2h and the second opening portion 4h along a peripheral edge of the first opening portion 2h and the second opening portion 4h. It should be noted that the first flat portion 21S and the second flat portion 41S are formed shorter in length (width) in a direction perpendicular to a flow direction of the exhaust gas G1 than the first flat portion 21L and the second flat portion 41L corresponding to the regions 2L (3L, 4L).

The first bead 25S of the first gasket substrate 2 is a one side support type flap bead including a first inclined surface portion 22S rising obliquely from the flat portion 21S so as to be spaced apart from the intermediate substrate 3, a convexly bent top portion 23S, and a second inclined surface portion 24S falling obliquely from the top portion 23S toward the opposite side of the first inclined surface portion 22S so as to approach the intermediate substrate 3 but formed not to contact the intermediate substrate 3.

Here, the front end of the second inclined surface portion 24S serves as the opening end 2a forming the opening portion 2h. As described above, the first bead 25S is formed by the first inclined surface portion 22S, the top portion 23S, and the second inclined surface portion 24S, and expands by a predetermined amount from the flat portion 21S toward the exhaust manifold side flange 10a. When the metal gasket 1 is sandwiched, the first bead 25S is crushed by the exhaust manifold side flange 10a to be extended in a flat shape, and the opening end 2a of the second inclined surface portion 24S matches the opening end 3a of the intermediate substrate 3.

It should be noted that the length of the first inclined surface portion 22S, the angle of the top portion 23S, and the length of the second inclined surface portion 24S in the first bead 25S are smaller than those of the first bead 25L corresponding to the regions 2L (3L, 4L), but the expansion height of the first bead 25S is the same as the expansion height of the first bead 25L. It should be noted that, without being limited to this, the expansion height of the first bead 25L may be higher than the expansion height of the first bead 25S. In this case, the reason for this is that even in the regions 2L (3L, 4L) of long bolt pitch, it is possible to prevent reduction in the surface pressure between the metal gasket 1 and the flanges.

The second bead 45S of the second gasket substrate 4 is a one side support type flap bead including a first inclined surface portion 42S rising obliquely from the flat portion 41S so as to be spaced apart from the intermediate substrate 3, a convexly bent top portion 43S, and a second inclined surface portion 44S falling obliquely from the top portion 43S toward the opposite side of the first inclined surface portion 42S so as to approach the intermediate substrate 3 but formed not to contact the intermediate substrate 3.

Here, the front end of the second inclined surface portion 44S serves as the opening end 4a forming the opening portion 4h. As described above, the second bead 45S is formed by the first inclined surface portion 42S, the top portion 43S, and the second inclined surface portion 44S, and expands by a predetermined amount from the flat portion 41S toward the exhaust side flange 20a. When the metal gasket 1 is sandwiched, the second bead 45S is crushed by the exhaust side flange 20a to be extended in a flat shape, and the opening end 4a of the second inclined surface portion 44S matches the opening end 3a of the intermediate substrate 3.

It should be noted that the length of the first inclined surface portion 42S, the angle of the top portion 43S, and the length of the second inclined surface portion 44S in the second bead 45S are smaller than those of the second bead 45L corresponding to the regions 2L (3L, 4L), but the expansion height of the second bead 45S is the same as the expansion height of the second bead 45L. It should be noted that, without being limited to this, the expansion height of the second bead 45L may be higher than the expansion height of the second bead 45S. In this case, the reason for this is that even in the regions 2L (3L, 4L) of long bolt pitch, it is possible to prevent reduction in the surface pressure between the metal gasket 1 and the flanges.

In this case, the first bead 25S of the first gasket substrate 2 and the second bead 45S of the second gasket substrate 4 are opposite in the expansion direction to each other, but are formed to have the same expansion amount. It should be noted that, without being limited to this, the expansion amount of the first bead 25S and the expansion amount of the second bead 45S need not be the same, but either one of the expansion amounts may be larger.

Meanwhile, as illustrated in FIG. 2, a portion corresponding to the regions 2L (3L, 4L) of the intermediate substrate 3 include a through-hole 33 (air layer) in a portion where the first bead 25L of the first gasket substrate 2 and the second bead 45L of the second gasket substrate 4 face each other.

This through-hole 33 is formed to have a predetermined width W in a direction perpendicular to the flow direction of the exhaust gas G1 and have a predetermined length L in a direction along the first bead 25L. It should be noted that it is desirable that the length L of the through-hole 33 be long enough to cover all the regions 2L (3L, 4L) as much as possible, but it is sufficient that at least the length L is greater than the width W.

It should be noted that in the portion corresponding to the regions 2S (3S, 4S) of the intermediate substrate 3, the through-hole 33 is not formed in the portion where the first bead 25L of the first gasket substrate 2 and the second bead 45L of the second gasket substrate 4 face each other.

<Action and Effect>

When mounted in a state of being strongly fastened by fastening bolts in a state of being sandwiched between the exhaust manifold side flange 10a and the exhaust side flange 20a, the metal gasket 1 of such a configuration is compressed by the exhaust manifold side flange 10a and the exhaust side flange 20a.

At this time, the first bead 25L of the first gasket substrate 2 and the second bead 45L of the second gasket substrate 4 are crushed, but due to the restoring force, the first gasket substrate 2 and the second gasket substrate 4 are brought into close contact with the exhaust manifold side flange 10a and the exhaust side flange 20a, and thus it is possible to ensure stable sealing properties.

At this time, in the intermediate substrate 4, the through-hole 33 is located in a portion where the first bead 25L of the first gasket substrate 2 and the second bead 45L of the second gasket substrate 4 face each other. This through-hole 33 functions as a heat insulating layer for preventing fluid heat of the exhaust gas G1 flowing from the opening 10b of the exhaust manifold 10 to the opening 20b of the exhaust pipe 20 from being transmitted toward an outer peripheral side in a direction perpendicular to the flow direction of the exhaust gas G1.

Because of the presence of the through-hole 33, it is possible to reduce the influence of the fluid heat of the exhaust gas G1 on most of the first bead 25L and the second bead 45L, thus it is possible to maintain the restoring force by suppressing early deterioration due to heat to the first bead 25L and the second bead 45L, and thus it is possible to prolong the life of the metal gasket 1 as compared with conventional metal gaskets.

Particularly, in the metal gasket 1, the regions 2L (3L, 4L) of long bolt pitch is more susceptible to heat than the regions 2S (3S, 4S) of short bolt pitch, and thus by using the through-hole 33 of the intermediate substrate 3 corresponding to the regions 2L (3L, 4L) as the heat insulating layer, it is possible to suppress early deterioration due to heat to the first bead 25L and the second bead 45L, and thus it is possible to prolong the life of the metal gasket 1 as compared with conventional metal gaskets.

Other Embodiments

It should be noted that in the above described embodiment, we have described the case of using the metal gasket 1 to seal between the exhaust manifold 10 and the exhaust pipe 20, but without being limited to this, the metal gasket 1 of the present disclosure may be used in any system such as an exhaust system for sealing between a turbine of a turbocharger and an exhaust pipe and an intake system for sealing between a cylinder head and a cylinder block.

In addition, in the above described embodiment, we have described the case of using the metal gasket 1, but without being limited to this, it may also be possible to use other various gaskets having high thermal conductivity such as a semi-metal gasket and a graphite gasket.

Further, in the above described embodiment, we have described the case of using the metal gasket 1 as a three-layer structure formed by laminating the first gasket substrate 2, the intermediate substrate 3, and the second gasket substrate 4, but without being limited to this, the metal gasket 1 may be a multi-layer structure formed by laminating three or more intermediate substrates 3.

Furthermore, in the above described embodiment, we have described the case of using the metal gasket 1 having rectangular opening portions 2h, 3h, and 4h, but without being limited to this, the metal gasket 1 may have a square-shaped opening portion or may have other opening portions of various shapes such as circular and elliptical shapes.

Furthermore, in the above described embodiment, we have described the case of providing the through-hole 33 only in the regions 2L (3L, 4L) of long bolt pitch of the intermediate substrate 4 of the metal gasket 1, but without being limited to this, it may also be possible to provide the through-hole 33 in the regions 2S (3S, 4S) of short bolt pitch. In this case, it is possible to suppress early deterioration due to heat to the first bead 25S and the second bead 45S in the regions 2S (3S, 4S) of short bolt pitch and to prolong the life of the metal gasket 1 as compared with conventional metal gaskets.

Hereinbefore, we have described the preferred embodiments of the present disclosure, but the present disclosure is not limited to the metal gasket 1 according to the above embodiments, and include all aspects contained in the concept of the present disclosure and the scope of the claims. Further, in order to achieve at least a part of the above-described effects, it may also be possible to appropriately selectively combine each configuration. For example, the shape, material, arrangement, size, and the like of each component in the above embodiments can be appropriately modified according to a specific use of the present disclosure.

What is claimed is:

1. A gasket sandwiched between an opening of a first member and an opening of a second member, the gasket comprising:
    a first gasket substrate including a first bead protruding along a peripheral edge of a first opening portion disposed corresponding to the opening of the first member, the first bead protruding toward a side of the first member, and the first gasket substrate being disposed on the side of the first member;
    a second gasket substrate including a second bead protruding along a peripheral edge of a second opening portion disposed corresponding to the opening of the second member, the second bead protruding toward a side of the second member, and the second gasket substrate being disposed on the side of the second member; and
    an intermediate substrate interposed between the first gasket substrate and the second gasket substrate,
    wherein the intermediate substrate includes a through-hole having a predetermined width and a predetermined length formed along the first bead and the second bead in a portion of the intermediate substrate facing the first bead and the second bead, and the intermediate substrate includes an intermediate opening portion disposed corresponding to the opening of at least one of the first member or of the second member,
    wherein the through-hole of the intermediate substrate has a relationship wherein the predetermined length is greater than the predetermined width, and the through-hole is spaced from the intermediate opening portion and is disposed in a portion of the intermediate substrate fully sandwiched between the first bead and the second bead, and
    wherein in an uninstalled state of the gasket being separated from at least one of the first member and the second member, the first gasket substrate and the second gasket substrate are spaced from the through-hole of the intermediate substrate such that the through-hole is open to at least one of the first opening portion of the first gasket substrate and the second opening portion of the second gasket substrate.

2. The gasket according to claim 1, wherein the gasket is configured to be fastened to the first member and to the second member by a plurality of fastening members in a manner such that there are a short inter-fastening distance and a long inter-fastening distance, and wherein the through-hole of the intermediate substrate is formed in a portion of the intermediate substrate corresponding to the long inter-fastening distance.

3. The gasket according to claim 1, wherein the through-hole is configured to be fully sandwiched between the first bead and the second bead such as to enclose the through-hole therebetween.

4. The gasket according to claim 1, wherein the first and second gasket substrates and the intermediate substrate are configured to be separated from one another at the inner periphery defining the intermediate opening portion upon withdrawal of at least one of the first and second members from the gasket.

5. A gasket configured to be sandwiched between an opening of a first member and an opening of a second member, the gasket comprising:

a first gasket substrate including a first bead protruding along a peripheral edge of a first opening portion configured to be disposed corresponding to the opening of the first member, the first bead configured to protrude toward and engage with a side of the first member;

a second gasket substrate including a second bead protruding along a peripheral edge of a second opening portion configured to be disposed corresponding to the opening of the second member, the second bead configured to protrude toward and engage with a side of the second member; and an intermediate substrate interposed between the first gasket substrate and the second gasket substrate, wherein the intermediate substrate includes an intermediate opening portion configured to be disposed corresponding to the openings of each of the first member and the second member, wherein the intermediate substrate includes a through-hole having a predetermined width and a predetermined length formed along the first bead and the second bead in a portion facing the first bead and the second bead, wherein the through-hole has a relationship such that the predetermined length is greater than the predetermined width, and the through-hole is spaced from the intermediate opening portion and is disposed in a portion of the intermediate substrate that is configured to be fully sandwiched between the first bead and the second bead upon engagement of the first and second member with the first and second members having engaged the gasket therebetween the first and second members, and wherein in an uninstalled state of the gasket being separated from at least one of the first member and the second member, the first gasket substrate and the second gasket substrate are spaced from the through-hole of the intermediate substrate such that the through-hole is open to at least one of the first opening portion of the first gasket substrate and the second opening portion of the second gasket substrate.

6. The gasket according to claim 5, wherein the through-hole is configured to be fully sandwiched between the first bead and the second bead such as to enclose the through-hole therebetween.

7. The gasket according to claim 5, wherein the first and second gasket substrates and the intermediate substrate are configured to be separated from one another at the inner periphery defining the intermediate opening portion upon withdrawal of at least one of the first and second members from the gasket.

* * * * *